United States Patent Office 3,540,051
Patented Nov. 10, 1970

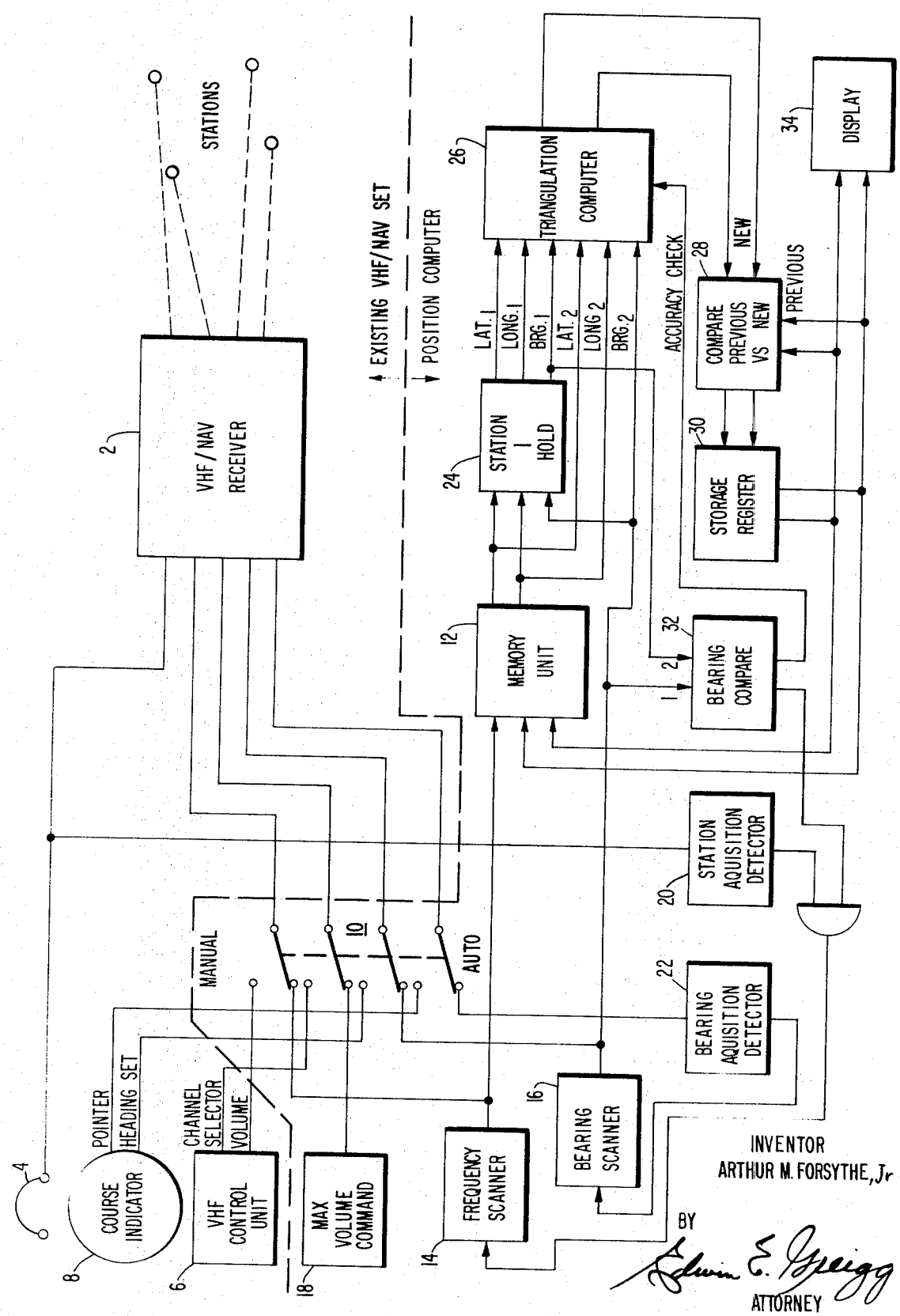

3,540,051
AIRCRAFT POSITION COMPUTER SYSTEM
Arthur M. Forsythe, Jr., Shelburne, Vt., assignor to Simmonds Precision Products, Inc., Tarrytown, N.Y., a corporation of New York
Filed Nov. 18, 1968, Ser. No. 776,643
Int. Cl. G01s 5/08
U.S. Cl. 343—112               5 Claims

ABSTRACT OF THE DISCLOSURE

A position computer system for aircraft which performs tuning and plotting functions continuously and automatically on a VHF/NAV receiver, by using computer storage techniques, provides station or facility locations and frequencies for determining continuously by the process of triangulation on the position of the aircraft in flight.

---

The present invention relates to position computer systems for use in aircraft for determining geographical positions automatically and continuously during flight and, more specifically, such systems utilizing existing VHF/NAV radio receivers.

There exists in the United States a network of omnirange facilities operating in the 108.2 to 118.0 mc. frequency band and most aircraft are equipped with VHF/NAV receivers for tuning into appropriate facilities during flight. Such receivers after being tuned in are able to display the magnetic bearing from the aircraft to the facility, and by deriving the bearing angle to two or more stations and applying the traditional methods of triangulation, the pilot is able to determine his location. The process of triangulation, however, can be cumbersome, especially in a crowded cockpit and in high speed aircraft where the time required to perform the triangulation process is often excessive under emergency conditions. The purpose of this invention is to allow for an automatic and continuous process of triangulation utilizing a simple and efficient method that employs existing equipment in the aircraft thereby overcoming the disadvantages of mechanical methods or complicated faulty systems previously in use.

It is an object of this invention to provide a system for automatically and continuously providing a display of geographic positions in an aircraft which utilizes conventional VHF/NAV radio receivers.

It is another object of this invention to provide a system for automatically determining position in an aircraft utilizing existing VHF/NAV radio receiving equipment and which will automatically and continuously perform the tuning process as well as the bearing angle derivation process for such equipment.

It is another object of this invention to provide a system for automatically determining the position of aircraft by utilizing triangulation computer techniques which is automatically and continuously performed.

It is yet another object of this invention to provide a system for determining position of aircraft utilizing existing radio receiver equipment and employing triangulation computer techniques in which automatic control is maintained over the VHF/NAV receiver tuning and bearing functions together with automatic interpretation of the resulting VHF and NAV outputs.

According to one embodiment utilizing the principles of this invention there is provided a position computer system that has stored within its memory elements the frequency latitude and longitude of a selected number of VHF facilities. After a station of sufficient signal strength is received, the frequency of the acquired station, together with approximate aircraft location data, are sent to a memory unit. For a given approximate aircraft location there will exist only one station within range of the aircraft and that station will be found by the memory unit which will then provide the exact latitude and longitude of the acquired station. This data, together with the bearing of the acquired station, will be stored in a register and the same process will be repeated for a second acquired station or facility. A triangulation computer will then determine the aircraft location as the intersection of the two bearing fixes and the newly computed position will be compared with the previous position and any difference in excess of some value consistent with the aircraft top speed and computer repetition rate will be considered as a possible error and the computation re-run.

Other objects and advantages will become apparent from a study of the following specification and drawings, in which there is shown a schematic diagram of the position computer system according to the principles of this invention.

Referring now to the drawing, there is shown a conventional VHF/NAV receiver 2. The receiver has a head phone output 4 together with a VHF control unit 6 providing channel selection and volume control, and a course indicator pointer 8. A switching bank arrangement 10 is provided for switching in the position computer system according to this invention to the receiver 2. As shown, the switches are in the automatic position for bringing the receiver 2 under control of the position computer network. In the manual position the switch allows the VHF/NAV receiver to operate in the conventional mode.

The position computer system constructed according to the principles of this invention will have a memory unit 12 within which is stored the frequency latitude and longitude of a selected number of VHF transmitter facilities. This memory unit 12 can be supplied with information to cover the entire geographic country or a regional or subregional area wherein only selected number of VHF facilities are utilized. The receiver 2 is provided with significantly appropriate stimuli in order to monitor certain receiver elements, for example, frequency selection (79 different channels), bearing relation (synchrosignals) and volume relation. This stimuli is provided by the frequency scanner 14 and the bearing scanner 16 as well as a maximum volume command 18 which are shown connected to the switching bank 10 for controlling the receiver 2 when the switching bank 10 is in its automatic position as shown.

The two functions which must be monitored by the receiver are signal strength and the course pointer output. The former may be controlled by an AGC unit or audio output level (not shown) and the latter is in the form of a DC voltage which becomes zero when the course indicator heading set is equal to the bearing from the station.

The frequency command is slewed by the frequency scanner 14 until a station acquisition detector 20 determines that a station of sufficient signal strength is being received as previously mentioned. The bearing command is then scanned by bearing acquisition detector 22 until the course pointer output is zero as previously mentioned. The frequency of the acquired station together with approximate aircraft location data are then sent to the memory unit 12. The approximate position data can be furnished by the latitudinal and longitudinal information derived from a previous computer cycle. For a given approximate aircraft location there will exist only one station within range of the aircraft and that station will be looked up and found by the memory unit 12. In fringe areas where sometimes, although very rarely, two stations at the same frequency are both within range, the memory unit will detect the uncertainty and disallow that frequency. The latitude, longitude and bearing of the acquired station will be stored in a hold station 1 register 24 which receives the output from the memory unit 12.

The frequency scan will then be continued until a second station is acquired and that station will be processed in the same manner as described above for the first station with the appropriate data as the latitude, longitude and bearing being stored rather than transferred into the hold register 24.

A triangulation computer 26 is connected to the output of the first station hold register 24 as well as the output of the bearing scanner 16. The computer 26 will determine the aircraft location as being at the intersection of the two bearing fixes. The newly computed position will be compared in a comparator 28 with the previous position taken from the display and any difference in excess of some value consistent with the aircraft top speed and computer repetition rate will be considered as a possible error and the computation then re-run. The output of the comparator 28 is fed into a second storage register 30 if such output, that is, the new latitude and new longitude, is acceptable.

Further, the triangulation computer 26 will reject any situation that will not give sufficient accuracy. This is accomplished by comparing the two bearing angles from the first and second stations, respectively, by means of a bearing comparator 32 which has its output connected to the triangulation computer 26, as shown. Near equal or equal angles would yield a very inaccurate trigonometric solution and consequently such information would then be avoided.

A display unit 34 is connected to the output of the storage register 30 and may be in the form of a pair of digital counters (not shown) either servo driven or using magnetically driven wheels. The readout will be latitude and longitude or miles north-south or east-west of some fixed point. With additional signal conditioning, the readout would be distance and bearing to a specific destination, and this destination need not have a VHF facility. Another type of readout would be a pictorial display (not shown). Here, a light beam would be focused so as to light a small dot on a translucent map of the area in which the aircraft is being flown. The map is placed either by mounting a slide or by having a roll of film built into the indicator. The light beam is then moved vertically or horizontally by angular motion of a suitable light gun emitter and the angular motion servos would be driven by the latitude, longitude signals.

That which is claimed is:

1. In a position computer system for aircraft having a VHF/NAV receiver for receiving signals transmitted from appropriate transmitter stations on the ground, the combination comprising, a frequency and bearing scanner means for monitoring said receiver, detector means connected to the output of said receiver for detecting a station of given signal strength, a memory unit connected to said scanning means and having stored therein information data reflecting latitude and longitude of a given number of transmitter stations on the ground, a first storage register for holding a given latitude and longitude information signal output from said memory unit for a detected station and a bearing signal from said scanning means for a station detected by said detector means, computer means connected to the output of said storage means for performing a triangulation computation utilizing said given latitude and longitude signal and the observed bearing signal from said detected station, a second storage register means connected to said computer means and display means connected to said second storage means for indicating the position of said aircraft.

2. In a position computer system for aircraft having a VHF/NAV receiver for receiving signals transmitted from appropriate transmitter stations on the ground, the combination comprising, a frequency scanner means and a bearing scanner means for monitoring said receiver, detector means connected to the output of said receiver for detecting a station of given signal strength and a bearing signal during a frequency scanning cycle, a memory unit connected to said frequency scanner means and having stored therein information data reflecting frequency latitude and longitude of a given number of transmitter stations, a first storage register connected to said bearing scanner means and to the output of said memory unit for holding a given frequency latitude and longitude information signal for a station detected by said detector means and a bearing signal from said detected station, a triangulation computer means connected to the output of said first storage means for delivering an output indicating the position of said aircraft, comparator means connected to said triangulation computer means for comparing the output thereof with a previous output, a second storage means connected to the output of said comparator means and the output of said second storage means being connected to said memory unit, to said comparator means and to a display means for continuously indicating the position of said aircraft.

3. In a position computer system for aircraft having a VHF/NAV receiver for receiving signals transmitted from appropriate transmitter stations on the ground, the combination comprising, a frequency scanner means and a bearing scanner means for monitoring said receiver, a station acquisition detector means connected to an output of said receiver for detecting a station of given signal strength, a bearing acquisition detector connected to an output of said receiver for detecting a bearing signal, a memory unit having stored therein information data reflecting frequency latitude and longitude of a given number of transmitter stations, a first storage register connected to the output of said bearing scanner means and to the output of said memory unit for holding a latitude and longitude information signal for a station detected by said detector means and a bearing signal, a triangulation computer means connected to the output of said first storage means for delivering an output indicating the actual position of said aircraft, comparator means connected to the output of said triangulation computer means for comparing the output thereof with a previous output, a second storage register connected to the output of said comparator means and the output of said second storage means being connected to said memory unit and a display means for providing a continuous signal indicating the position of said aircraft.

4. In a position computer system for aircraft utilizing a VHF/NAV receiver for receiving signals transmitted from appropriate transmitter facilities on the ground, the combination comprising, a frequency scanner means and a bearing scanner means for monitoring said receiver, a station acquisition detector means connected to an output of said receiver for detecting a station of given signal strength, a bearing acquisition detector connected to an output of said receiver for detecting a given bearing signal, a memory unit having stored therein information data reflecting frequency latitude and longitude of a given number of transmitting stations, said station acquisition detector means being connected through said frequency scanner means to said memory unit, a first storage register for holding a frequency latitudinal and longitudinal information signal received from said memory unit in response to a signal supplied by said frequency scanning means, the output of said bearing acquisition detector means being connected through said bearing scanner means to said first storage register for supplying a bearing signal thereto, a triangulation computer means connected to said first storage means, comparator means connected to said triangulation computer means for comparing the output of said triangulation computer means with a previous output, and a second storage register connected to the output from said comparator means and having its output connected to said memory unit and said display means for providing a continuous signal indicating the position of said aircraft.

5. In a system according to claims 3 and 4, wherein a bearing comparator means is connected to the output of said bearing scanning means and the output of said first storage holding means and the output of said bearing comparator being connected to said triangulation computer means for preventing bearing signals of substantially equal strength from being computer.

References Cited
UNITED STATES PATENTS

| | | | |
|---|---|---|---|
| 2,717,735 | 9/1955 | Luck | 235—150.27 |
| 2,718,061 | 9/1955 | Omberg et al. | |
| 3,266,041 | 8/1966 | Robins | 343—112 |

RODNEY D. BENNETT, Primary Examiner

R. E. BERGER, Assistant Examiner

U.S. Cl. X.R.

235—150.27